United States Patent
Agner et al.

(10) Patent No.: US 10,792,990 B2
(45) Date of Patent: Oct. 6, 2020

(54) HYBRID MODULE FOR A DRIVE TRAIN OF A MOTOR VEHICLE

(71) Applicant: Schaeffler Technologies AG & Co. KG, Herzogenaurach (DE)

(72) Inventors: Ivo Agner, Bühl (DE); Aurelie Keller, Oberhoffen sur Moder (FR); Luben Krahtov, Baden-Baden (DE)

(73) Assignee: SCHAEFFLER TECHNOLOGIES AG & CO. KG, Herzogenaurach (DE)

(*) Notice: Subject to any disclaimer, the term of this patent is extended or adjusted under 35 U.S.C. 154(b) by 321 days.

(21) Appl. No.: 15/743,577

(22) PCT Filed: Jul. 12, 2016

(86) PCT No.: PCT/DE2016/200319
§ 371 (c)(1),
(2) Date: Jan. 10, 2018

(87) PCT Pub. No.: WO2017/008807
PCT Pub. Date: Jan. 19, 2017

(65) Prior Publication Data
US 2018/0194215 A1    Jul. 12, 2018

(30) Foreign Application Priority Data
Jul. 13, 2015   (DE) .......................... 10 2015 213 101

(51) Int. Cl.
*B60K 6/387* (2007.10)
*F16D 13/70* (2006.01)
(Continued)

(52) U.S. Cl.
CPC ............... *B60K 6/387* (2013.01); *B60K 6/40* (2013.01); *B60K 6/405* (2013.01); *F16D 13/385* (2013.01);
(Continued)

(58) Field of Classification Search
None
See application file for complete search history.

(56) References Cited

U.S. PATENT DOCUMENTS

| 8,757,305 B2 * | 6/2014 | Roske | B60K 6/38 |
| | | | 180/65.22 |
| 2009/0200094 A1 * | 8/2009 | Zohrer | B60L 50/16 |
| | | | 180/65.22 |

(Continued)

FOREIGN PATENT DOCUMENTS

| CN | 102667205 A | 9/2012 |
| CN | 103223856 A | 7/2013 |

(Continued)

OTHER PUBLICATIONS

International Search Report for PCT/DE2016/200319; 2 pgs; dated Oct. 24, 2016 by European Patent Office.

*Primary Examiner* — Mark A Manley
(74) *Attorney, Agent, or Firm* — Kevin L. Parks

(57) ABSTRACT

A compact hybrid module includes a separating clutch with a reliably controlled actuation pressure. The hybrid module is provided with a disengagement device having a pressure pot for the transmission of force from a disengagement bearing to a pressure plate of the separating clutch or K0 separating clutch. The separating clutch itself can be actuated via the pressure pot without an additional lever ratio. Owing to a low level of hysteresis as a result of the direct actuation, the clutch can then be precisely regulated in terms of pressure.

20 Claims, 3 Drawing Sheets

(51) Int. Cl.
  *F16D 13/40*   (2006.01)
  *B60K 6/405*   (2007.10)
  *F16D 48/02*   (2006.01)
  *F16D 21/06*   (2006.01)
  *F16D 13/38*   (2006.01)
  *B60K 6/40*    (2007.10)
  *F16D 25/0635* (2006.01)
  *F16D 25/08*   (2006.01)

(52) U.S. Cl.
  CPC ............ *F16D 13/40* (2013.01); *F16D 13/70* (2013.01); *F16D 21/06* (2013.01); *F16D 25/14* (2013.01); *B60Y 2200/92* (2013.01); *F16D 25/0635* (2013.01); *F16D 25/082* (2013.01); *F16D 2013/706* (2013.01); *F16D 2021/0615* (2013.01); *F16D 2021/0653* (2013.01); *F16D 2021/0669* (2013.01); *F16D 2500/1066* (2013.01); *Y10S 903/914* (2013.01)

(56) References Cited

U.S. PATENT DOCUMENTS

| | | | | |
|---|---|---|---|---|
| 2011/0221292 | A1* | 9/2011 | Kuwahara | F16D 25/082 310/78 |
| 2013/0313063 | A1* | 11/2013 | Fujii | F16D 25/044 192/66.3 |
| 2014/0128218 | A1* | 5/2014 | Ruder | B60K 6/383 477/5 |

FOREIGN PATENT DOCUMENTS

| | | | |
|---|---|---|---|
| CN | 103826894 A | | 5/2014 |
| DE | 102011117781 A1 | | 5/2013 |
| DE | WO2014026685 | * | 2/2014 |
| DE | 102014206330 A1 | | 10/2014 |
| WO | 2014026685 A1 | | 2/2014 |

\* cited by examiner

HYBRID MODULE FOR A DRIVE TRAIN OF A MOTOR VEHICLE

CROSS-REFERENCE TO RELATED APPLICATIONS

This application is the United States National Phase of PCT Appin. No. PCT/DE2016/200319 filed Jul. 12, 2016, which claims priority to German Application No. DE102015213101.7 filed Jul. 13, 2015, the entire disclosures of which are incorporated by reference herein.

TECHNICAL FIELD

The present disclosure relates to a hybrid module for a drivetrain of a motor vehicle, which drivetrain has an electric machine, an internal combustion engine and a transmission. The hybrid module has a rotor element which can be driven by means of the electric machine, a separating clutch which is arranged within the rotor element and which has a pressure plate, and a disengagement device for actuating the separating clutch, having a disengagement bearing.

BACKGROUND

A corresponding hybrid module is known from WO 2014/026685 A1. Said document presents a hybrid module for a drivetrain of a motor vehicle, in which an electric machine is arranged between an internal combustion engine and a transmission. The hybrid module has the rotor of the electric machine, a separating clutch which is arranged within the rotor and which has a pressure plate, and a disengagement device for actuating the separating clutch, having a disengagement bearing. During the actuation of the separating clutch, a piston of the central disengagement means is moved axially in order to deform plate spring tongues of a plate spring via a disengagement bearing. In other words, the separating clutch is actuated via a lever mechanism which is formed by the plate spring.

BRIEF SUMMARY

A compact hybrid module includes a separating clutch with a reliably controlled actuation pressure.

The hybrid module is provided with a disengagement device having a pressure pot for the transmission of force from a disengagement bearing to a pressure plate of the separating clutch or K0 separating clutch. The separating clutch itself can be actuated via the pressure pot without an additional lever ratio. Owing to a low level of hysteresis as a result of the direct actuation, the clutch can then be precisely regulated in terms of pressure.

The rotor element is preferably the rotor of an electric machine or some other rotor element that can be driven by the electric machine, in particular a roller that can be driven via a belt drive.

In one embodiment, it is provided that the transmission of force from the disengagement bearing via the pressure pot to the pressure plate is a transmission of force without a lever action. Such a transmission of force is particularly precise.

In one embodiment, it is provided that the disengagement device has a central disengagement means unit with a piston for the transmission of force to the disengagement bearing. The piston and engagement bearing are preferably in a radially nested arrangement. This arrangement of piston and engagement bearing yields a very compact hybrid module.

In an example embodiment, the short guide length on the piston is <0.4 times the mean piston diameter and, in combination with a suitable degree of play, permits a cardanic tilting movement of the piston, and therefore geometrical errors (in this case for example oblique positions) in the case of a rotational speed difference between disk and pressure plate can be easily compensated.

In a further embodiment, the central disengagement means unit is a concentric slave cylinder (CSC) unit. Such a unit is known per se. The separating clutch may be hydraulically actuated by means of a CSC with short pistons. In this way, by means of a tilting degree of freedom, oblique positions of the actuation system of the separating clutch can be compensated.

In a yet further embodiment, the disengagement device and the separating clutch are arranged axially one behind the other in the rotor element.

In one embodiment, it is provided that the pressure plate (of the separating clutch) is connected by means of at least one leaf spring element to a rotor web of the rotor.

In a further embodiment, it is provided that the pressure pot and the pressure plate are integrally connected. One unit thus realizes both the pressure pot and the pressure plate. This embodiment of the hybrid module is particularly compact. It is however alternatively sufficient for the pressure plate to be guided in a flank-centred manner in the rotor web. Axially, this is always pressed against the engagement bearing by the leaf spring element of the pressure plate.

In one embodiment, it is provided that the hybrid module has a clutch device, in particular dual clutch, connected downstream of the electric machine in the drivetrain. In general, the clutch device may be formed as a single clutch or as a multiple clutch. In one embodiment, the clutch device is in the form of a dual clutch. The solid shaft of the dual clutch, that is to say the K1 transmission input shaft, is mounted in a shaft which is driven by an internal combustion engine, the intermediate shaft of the hybrid module.

In one embodiment, it is provided that the rotor element is connected rotationally conjointly by means of at least one connection to a counterplate of the starting clutch, directly or indirectly via an intermediate element.

Finally, it is provided that the hybrid module has a dual-mass flywheel connected upstream of the separating clutch in the drivetrain. A dual-mass flywheel of said type serves for equalizing rotational non-uniformities.

BRIEF DESCRIPTION OF THE DRAWINGS

Embodiments, to which said disclosure is however not restricted and from which further features according to the disclosure can emerge, are shown in the following figures.

In the figures.

DETAILED DESCRIPTION

Figure 1:
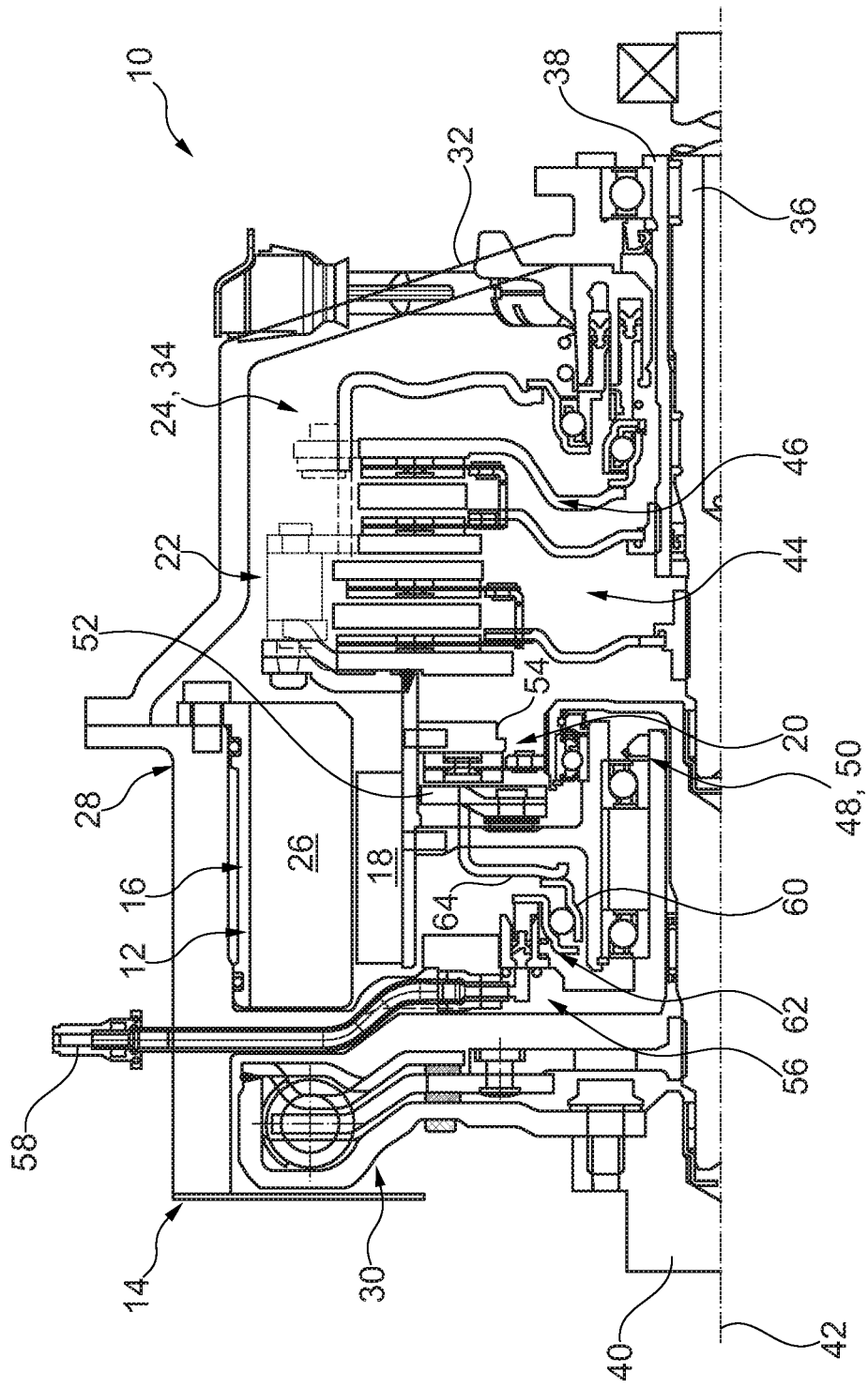
FIG. 1 shows a hybrid module according to a first embodiment.

FIG. 1 shows a part of a drivetrain 10 of a motor vehicle in a sectional illustration. In the drivetrain 10, an electric machine 12 is arranged between an internal combustion engine (not shown) and a transmission (likewise not shown). The electric machine 12 serves as drive machine and is part of a hybrid module 14. Said hybrid module 14 has the following main components: (i) a functional unit 16 having a rotor element 18 formed as a rotor of the electric machine 12, having a separating clutch 20 arranged within the rotor element 18 and having at least one clutch part 22, which is connected rotationally conjointly to the rotor element 18, of a clutch device 24, (ii) a housing unit 28 which partially accommodates the functional unit 16 and a stator 26 of the electric machine 12, (iii) a dual-mass flywheel 30 which is connected upstream of the separating clutch 20 in the drivetrain 10, and (iv) a housing part 32, which accommodates the clutch device 24, of the transmission. The clutch device 24 is formed as a dual clutch 34. Accordingly, the transmission is formed as a dual-clutch transmission, of which only the two transmission input shafts 36, 38 are illustrated.

The following path of the drivetrain is realized: Output shaft 40 of the internal combustion engine—dual-mass flywheel 30—separating clutch 20—rotor element 18 of the electric machine 12 formed as an internal-rotor machine—clutch device 24—transmission input shaft 36, 38. Here, the corresponding shafts 36, 38, 40 lie on a common axis 42, which forms the main axis of the hybrid module 14.

The clutch device 24, which is formed as a dual clutch 34, has two clutches 44, 46 with corresponding pressure plates, counterplates, clutch disks and actuation devices.

The rotor element 18 has, in its interior, a rotor bearing arrangement 48 which serves as central bearing device 50, by means of which the entire functional unit 16 is rotatably mounted in the housing unit 28.

Figure 3:
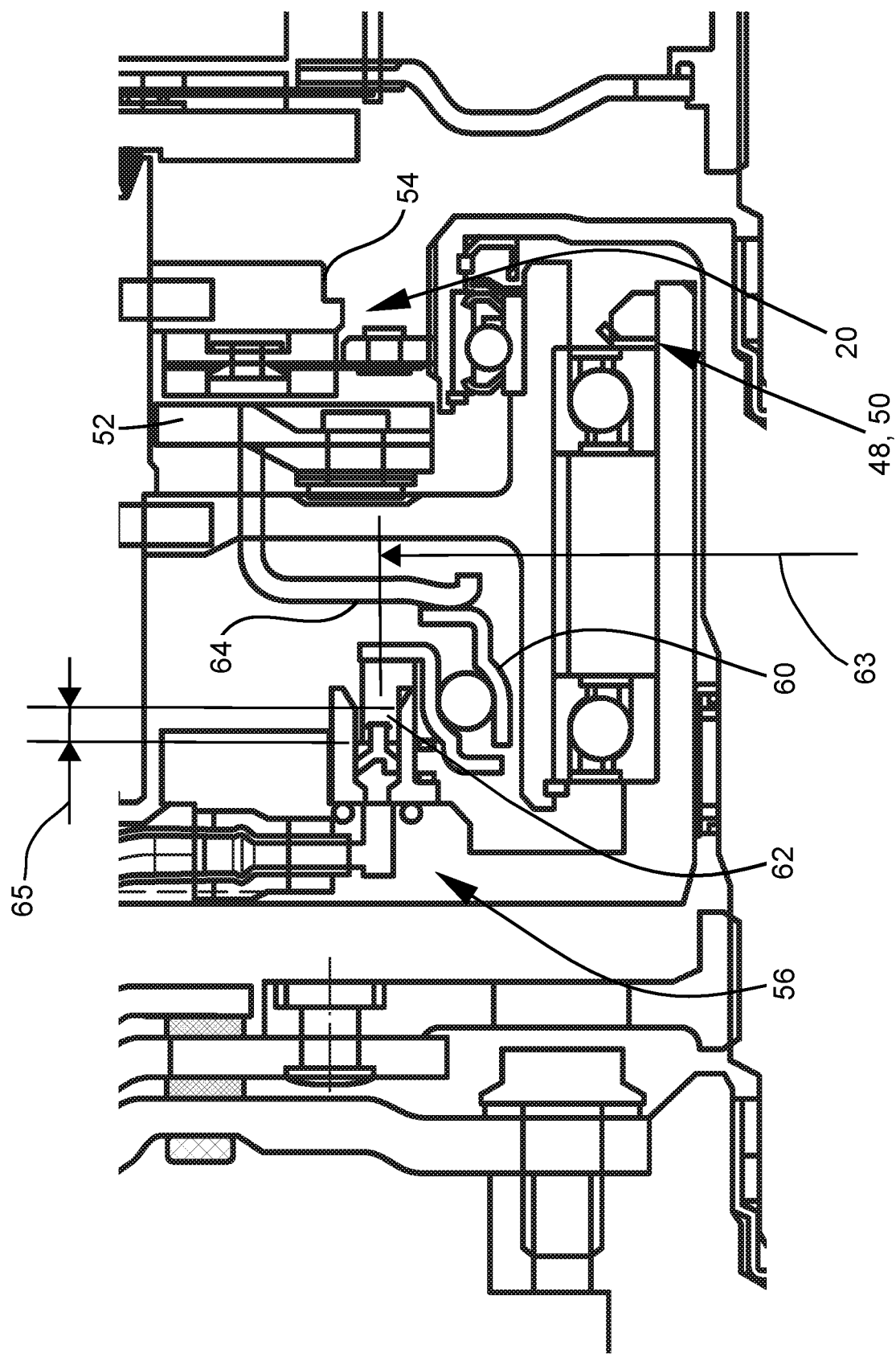
FIG. 3 shows a detail view of FIG. 1.

FIG. 3 shows a detail view of FIG. 1. The following description makes reference to FIGS. 1 and 3. The separating clutch 20 is hydraulically actuable. It has a pressure plate 52 and a counterplate 54 and is actuated by means of a disengagement device 56 via a pressure connector 58. The disengagement device 56 has a disengagement bearing 60, a central disengagement means unit with a piston 62 for transmitting force to the disengagement bearing 60, and a pressure pot 64 for transmitting force from the disengagement bearing 60 to the pressure plate 52 of the separating clutch 20. Piston 62 includes mean piston diameter 63 and guide length 65. The transmission of force by means of said pressure pot 64 is a transmission of force without a lever action.

The following function is realized:

The piston 62 of the central disengagement means acts on the disengagement bearing 60, which in turn acts directly on the pressure pot 64, which is connected to a pressure plate 52 of the separating clutch 20, without a lever mechanism between disengagement bearing 60 and separating clutch 20.

Figure 2:
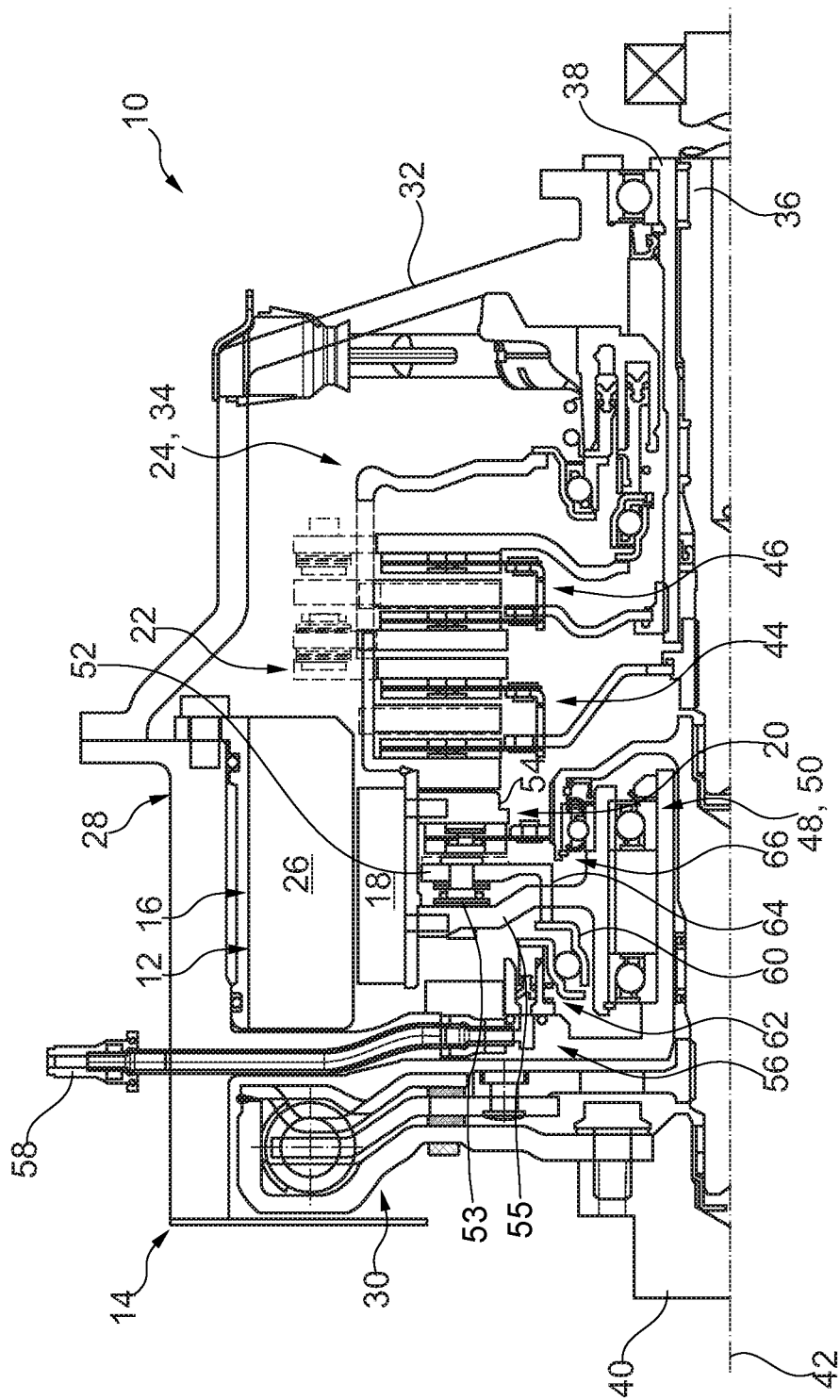
FIG. 2 shows a hybrid module according to a second embodiment.

FIG. 2 shows another embodiment of the hybrid module 14. This substantially corresponds to the embodiment of the hybrid module 14 from FIG. 1, such that only the differences will be discussed here. In this embodiment, the pressure pot 64 and the pressure plate 52 are integrally connected, that is to say form an integral unit 66.

If said unit 66, which combines the functionality of the pressure pot 64 and the pressure plate 52, is used, a leaf spring connection 53 of the pressure plate 52 to a rotor web 55 is provided radially outside the disengagement bearing 60 and the central disengagement means (piston 62) in order to thereby reduce the required structural space.

The piston 62 of the central disengagement means acts on the disengagement bearing 60, which in turn acts directly on the unit 66, which combines the functionality of the pressure pot 64 and of the pressure plate 52 without a lever mechanism between disengagement bearing 60 and separating clutch 20.

Owing to the axially short extension through the inside of the rotor web, with a leaf spring connection simultaneously arranged radially outside the engagement bearing 60 and the CSC piston 62, the available structural space can be optimally utilized.

The directly actuated separating clutch 20 is characterized, owing to the absence of friction points of an absent lever actuation means, by a very small degree of actuation hysteresis. Said small degree of force hysteresis permits torque regulation at the separating clutch 20 by means of the direct regulation of the pressure in the CSC.

Owing to the use of a short-piston CSC with possible tilting of the piston 62, it is furthermore possible to compensate actuation oblique positions such as may arise owing to geometrical oblique position errors of the pressure pot 64 of the pressure plate 52 and counterplate 54 and of the disk. Without said tilting compensation, torque excitations may arise which are dependent on the rotational speed difference.

LIST OF REFERENCE DESIGNATIONS

10 Drivetrain
12 Machine, electric
14 Hybrid module
16 Functional unit
18 Rotor element
20 Separating clutch
22 Clutch part
24 Clutch device
26 Stator, electric machine
28 Housing unit
30 Dual-mass flywheel
32 Housing part (transmission)
34 Dual clutch
36 Transmission input shaft, first
38 Transmission input shaft, second
40 Output shaft
42 Axis
44 Clutch, first
46 Clutch, second
48 Rotor bearing arrangement
50 Bearing device, central (functional unit)
52 Pressure plate (separating clutch)
53 Leaf spring connection
54 Counterplate (separating clutch)
55 Rotor web
56 Disengagement device
58 Pressure connector
60 Disengagement bearing
62 Piston
63 Piston mean diameter
64 Pressure pot
65 Piston guide length
66 Unit, integral

The invention claimed is:

1. A hybrid module for a drivetrain of a motor vehicle comprising:
    a rotor element arranged to be driven by an electric machine;
    a separating clutch arranged within the rotor element;
    a disengagement device for actuating the separating clutch; and
    a leaf spring, wherein:
        the separating clutch includes a pressure plate;
        the disengagement device includes a piston, a disengagement bearing and a pressure pot;

the piston is for transmitting a force to the disengagement bearing;

the disengagement bearing includes a roller element entirely radially inside of the piston;

the pressure pot is for transmitting the force from the disengagement bearing to the pressure plate without a lever action;

the rotor element includes a rotor web; and the leaf spring connects the pressure plate to the rotor web.

2. The hybrid module of claim 1, wherein a piston guide length is less than 0.4 times a mean piston diameter.

3. The hybrid module of claim 2, wherein the piston is a part of a concentric slave cylinder unit.

4. The hybrid module of claim 1, wherein the disengagement device and the separating clutch are arranged axially one behind the other.

5. The hybrid module of claim 1, wherein the pressure pot and the pressure plate are integrally connected.

6. A drivetrain for a motor vehicle comprising:
the electric machine;
an internal combustion engine;
a transmission; and,
the hybrid module of claim 1.

7. The drivetrain of claim 6, further comprising a dual clutch including at least one clutch connected downstream of the electric machine.

8. The drivetrain of claim 6, further comprising a starting clutch with a counter plate rotationally connected to the rotor element.

9. The drivetrain of claim 8 wherein the counter plate and the rotor element are directly connected.

10. The drivetrain of claim 8 wherein the counter plate and the rotor element are indirectly connected via an intermediate element.

11. A hybrid module for a drivetrain of a motor vehicle comprising:
a rotor element arranged to be driven by an electric machine;
a separating clutch arranged within the rotor element; and,
a disengagement device for actuating the separating clutch, wherein:

the separating clutch includes a pressure plate;
the disengagement device includes a disengagement bearing, a piston and a pressure pot;
the pressure pot is for transmitting a force from the disengagement bearing to the pressure plate without a lever action;
the piston comprises a variable guide length that increases when the piston is retracted and decreases when the piston is extended, and a mean piston diameter; and
the variable guide length is less than 0.4 times the mean piston diameter when the piston is retracted.

12. The hybrid module of claim 11 wherein the piston is a component of a concentric slave cylinder unit.

13. The hybrid module of claim 11 wherein the disengagement device and the separating clutch are arranged axially behind one another.

14. The hybrid module of claim 11, further comprising a leaf spring element, wherein the rotor element comprises a rotor web and the leaf spring connects the pressure plate to the rotor web.

15. The hybrid module of claim 11, wherein the pressure pot and the pressure plate are integrally connected.

16. A drivetrain for a motor vehicle comprising:
the electric machine;
an internal combustion engine;
a transmission; and,
the hybrid module of claim 11.

17. The drivetrain of claim 16, further comprising a dual clutch including at least one clutch connected downstream of the electric machine.

18. The drivetrain of claim 16, further comprising a starting clutch with a counter plate rotationally connected to the rotor element.

19. The drivetrain of claim 18 wherein the counter plate and the rotor element are directly connected.

20. The drivetrain of claim 18 wherein the counter plate and the rotor element are indirectly connected via an intermediate element.

* * * * *